United States Patent [19]

Kiuchi et al.

[11] 4,222,050
[45] Sep. 9, 1980

[54] MOVING TARGET INDICATION RADAR

[75] Inventors: Eichi Kiuchi; Takeru Irabu, both of Tokyo, Japan

[73] Assignee: Nippon Electric Co., Ltd., Tokyo, Japan

[21] Appl. No.: 961,169

[22] Filed: Nov. 16, 1978

[30] Foreign Application Priority Data

Nov. 17, 1977 [JP] Japan .................................. 52-138763
Oct. 31, 1978 [JP] Japan .................................. 53-134301

[51] Int. Cl.² ............................................. G01S 9/42
[52] U.S. Cl. ................................... 343/7.7; 343/5 FT
[58] Field of Search ......................... 343/5 FT, 7.7

[56] References Cited

U.S. PATENT DOCUMENTS

| 3,680,105 | 7/1972 | Goldstone | 343/5 FT X |
|---|---|---|---|
| 3,875,391 | 4/1975 | Shapiro et al. | 343/5 FT X |
| 4,047,173 | 9/1977 | Miller | 343/5 FT X |
| 4,053,885 | 10/1977 | Tomita et al. | 343/7.7 |
| 4,060,850 | 11/1977 | Speiser | 343/5 FT X |
| 4,075,630 | 2/1978 | Shapiro et al. | 343/5 FT X |

Primary Examiner—Malcolm F. Hubler
Attorney, Agent, or Firm—Sughrue, Rothwell, Mion, Zinn and Macpeak

[57] ABSTRACT

A moving target indication radar (MTI) having a high azimuthal position detection accuracy. The received radar return signal is separated into quadrature components which are each converted to a series of digital samples. A continuous discrete fast Fourier transform is then performed on groups of samples corresponding to a predetermined number of contiguous azimuthal units of identical range producing an equal number of output Doppler frequency components which represent the relative speeds of stationary and moving objects within the contiguous azimuthal units. A new separate transform operation is performed for each new sample received. The transform outputs are processed to separately detect the stationary and moving objects.

13 Claims, 14 Drawing Figures

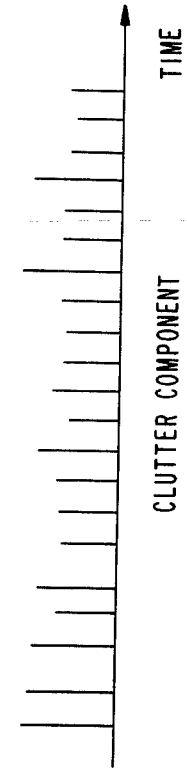
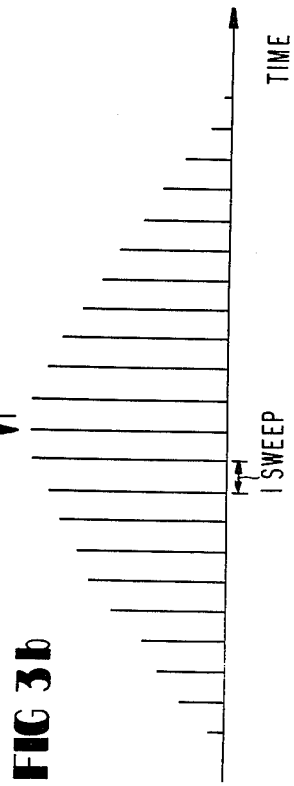
FIG. 4a RADAR RETURNS CLUTTER+TARGET RETURN
FIG. 4b CLUTTER COMPONENT CLUTTER
FIG. 4c TARGET RETURN COMPONENT TARGET M
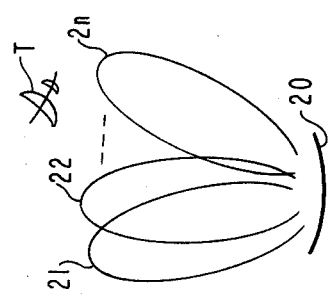
FIG. 2
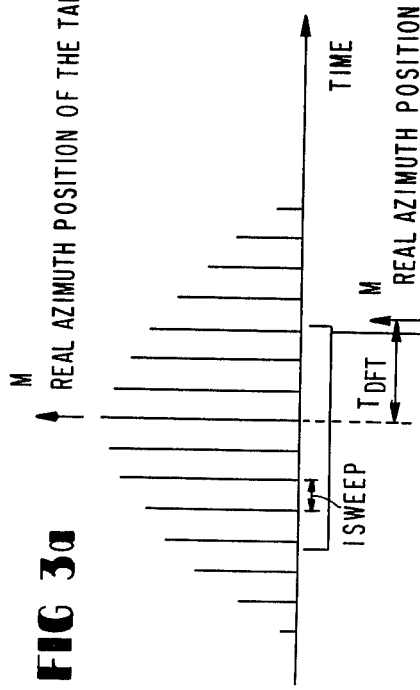
FIG. 3a M REAL AZIMUTH POSITION OF THE TARGET
FIG. 3b M REAL AZIMUTH POSITION OF THE TARGET

MOVING TARGET INDICATION RADAR

BACKGROUND OF THE INVENTION

1. Field of the Invention

The invention relates to a moving target indication radar and, more particularly, a radar of this kind having a high accuracy in the detection of azimuthal positions of moving targets.

2. Prior Art

A radar system, particularly an air traffic control (ATC) radar such as an airport surveillance radar (ASR) and an air route surveillance radar (ARSR) must not only discriminate the returns from moving objects (targets) from undesirable returns from stationary objects such as buildings and hills but also must detect a plurality of targets separately from one another.

The undesired returns include ground clutter attributed to buildings and undulating terrains, sea clutter caused by sea surface, weather clutter caused by rain fall and rain clouds, "angel echo" arising from large flocks of migrating birds, and the like. The conventional MTI (moving target indicator) is well adapted for rejecting ground clutter. A MTI canceller, however, is unable to reject clutter having a speed component such as sea clutter, "angel echo," weather clutter and the like. On the other hand, the MTI canceller rejects, together with the ground clutter, the returns from a target having zero or close-to-zero Doppler speed component such as an aircraft flying tangentially to the radar system.

The Log-CFAR (Logarithmic Amplification and Constant False Alarm Rate) technique, which has been proposed to alleviate these disadvantages, is discussed in detail in a paper entitled "Detection Performance of the Cell Averaging Log/CFAR Receiver" by V. G. Hansen and H. R. Ward, IEEE Transaction of AES-8, p-648, 1972. The Log-CFAR technique, based on the fact that the sea and weather clutter has an amplitude distribution similar to the Rayleigh distribution, employs the combination of a logarithmic amplifier and a CFAR circuit to suppress the clutter components to a level comparable to the noise level inherent to the radar receiver. However, desired target detection is impossible for the Log-CFAR technique when the target returns are not higher in level than the moving clutter.

Another problem involved in the Log-CFAR technique resides in the detection of a plurality of targets located at about the same distance from the radar system which have different Doppler speeds. That is to say, the technique cannot separately detect such targets for every Doppler speed. The application of a Log-CFAR to an ATC radar system is far from being sufficient because that the separate detection of targets is essential to an ATC radar system.

These difficulties involved in the conventional techniques are attributed to the fact that the signal processing for the clutter rejection and target detection are all performed in the time domain. To overcome these difficulties, the signal processing must be performed in the frequency domain. To achieve this, the radar signal must be converted through Fourier transform to various clutter and target components mutually separated in the frequency domain, and the separated components must be processed on a real time basis.

It is the fast Fourier transform that provides the basis for real time processing. An algorithm for the fast Fourier transform was proposed by J. W. Cooley et al in an article "An Algorithm for the Machine Calculation of Complex Fourier Series" Mathematics Computation, Volume 19, No. 90, page 297, April 1965. Moreover, the marked reduction in the manufacturing cost of the circuit to perform the algorithm made possible by the recent progress in LSI technology has induced various proposals for the circuits for the fast Fourier transform.

A typical example of those circuits is described by G. C. O'Leary in a paper "Nonrecursive Digital Filter Using Cascade Fast Fourier Transformers", published in IEEE Transaction on Audio and Electroacoustic, Volume AU-18, No. 2, June 1970.

For a better understanding of the O'Leary's proposal, the nature of a radar reception signal will now be briefly described.

A microwave pulse (a radar scanning pulse) is radiated from an antenna rotating at a constant speed into space and is reflected at stationary objects and targets in the scanned space with the result that the returns are obtained for every azimuth region corresponding to one radar scanning pulse (referred to as a unit azimuth region) in a chain of radar data respectively representative of the objects and targets existing respectively in the range regions (referred to as unit range regions) each corresponding to the width of the scanning pulse. (When the radar reception signal is sampled by a pulse having a repetition period equal to one half of the scanning pulse width, the unit range region is one half of that defined above). Since such a radar data chain is obtained for each scanning pulse the radar data chains are successively obtained, as the scanning pulses are radiated into space at a fixed repetition rate.

The radar data corresponding to each of the unit range regions (a unit region also in the azimuth direction) represents the vector sum of the return energy from stationary objects and targets lying in the unit range region. Since the beam pattern of the transmitting antenna has a width large enough to cover a plurality of unit azimuth regions, each scanning pulse always irradiates a plurality of unit azimuth regions. Therefore, the radar data obtained from adjacent unit azimuth regions show a considerably high correlation between them. The Fourier transform mentioned above is based on this correlation present in the radar data. More particularly, the radar data obtained from the adjacent unit azimuth regions for each unit distance in the range direction are subjected to correlation analysis to detect Doppler frequency components (including zero Dopper speed component) of the returns from stationary objects and targets in the scanned space, for every unit range distance over all the azimuth directions.

Based on the above-outlined nature of radar data, the O'Leary circuit is so designed that the radar data incoming successively from eight unit azimuth regions (located at the same distance in the range direction) are successively subjected to a series operation to produce eight Doppler frequency components (including a zero Doppler speed component). It should be noted here that while the O'Leary paper does not clearly state that the input data is a radar data, the input data treated there is exactly the same as the above-mentioned radar data. This conventional circuit proposed by O'Leary is arranged to produce eight Doppler frequency components, i.e., eight Fourier transform outputs, for the corresponding eight input radar data samples, so that the output appears intermittently at an interval eight times as large as that of the input radar data. In other words, one set of Fourier transform outputs is produced for every eight radar scanning pulses.

Therefore, in a radar system based on the O'Leary circuits, the azimuth direction resolution for the target detection is merely one-eighth of the original resolution (which was high enough to recognize targets on one unit azimuth region basis). The low resolution in the azimuthal direction means that a plurality of targets lying adjacent to each other in the azimuthal direction cannot be separately detected, and that the performance of the ATC radar system is limited accordingly.

SUMMARY OF THE INVENTION

Accordingly, an object of the invention is to provide a moving target indication radar having an enhanced azimuthal accuracy of the target detection.

Another object of the invention is to provide a moving target indication radar of simple construction and low manufacturing cost.

According to the invention, there is provided a moving target indication radar comprising a Fourier transform circuit capable of producing a set of Fourier transform outputs corresponding to a given number (e.g. eight as in the above-mentioned case) of radar data samples every time one radar data sample is received, the one radar data sample being included in the number of the input radar data, whereby the accuracy of the target position in the azimuthal direction is improved. This is in clear contrast to the conventional radar based on the O'Leary circuit which intermittently provides the Fourier transform output for every eight radar returns, deteriorating the resolution as mentioned above.

Other objects and features of the invention will be apparent from the following description, taken in connection with the accompanying drawings, in which:

BRIEF DESCRIPTION OF THE DRAWINGS

FIG. 2 shows an antenna beam pattern for illustrating the principle of the invention;

FIGS. 3 and 4 show waveforms of a radar reception signal in the system shown in FIG. 1;

DESCRIPTION OF THE PREFERRED EMBODIMENT

Figure 1:
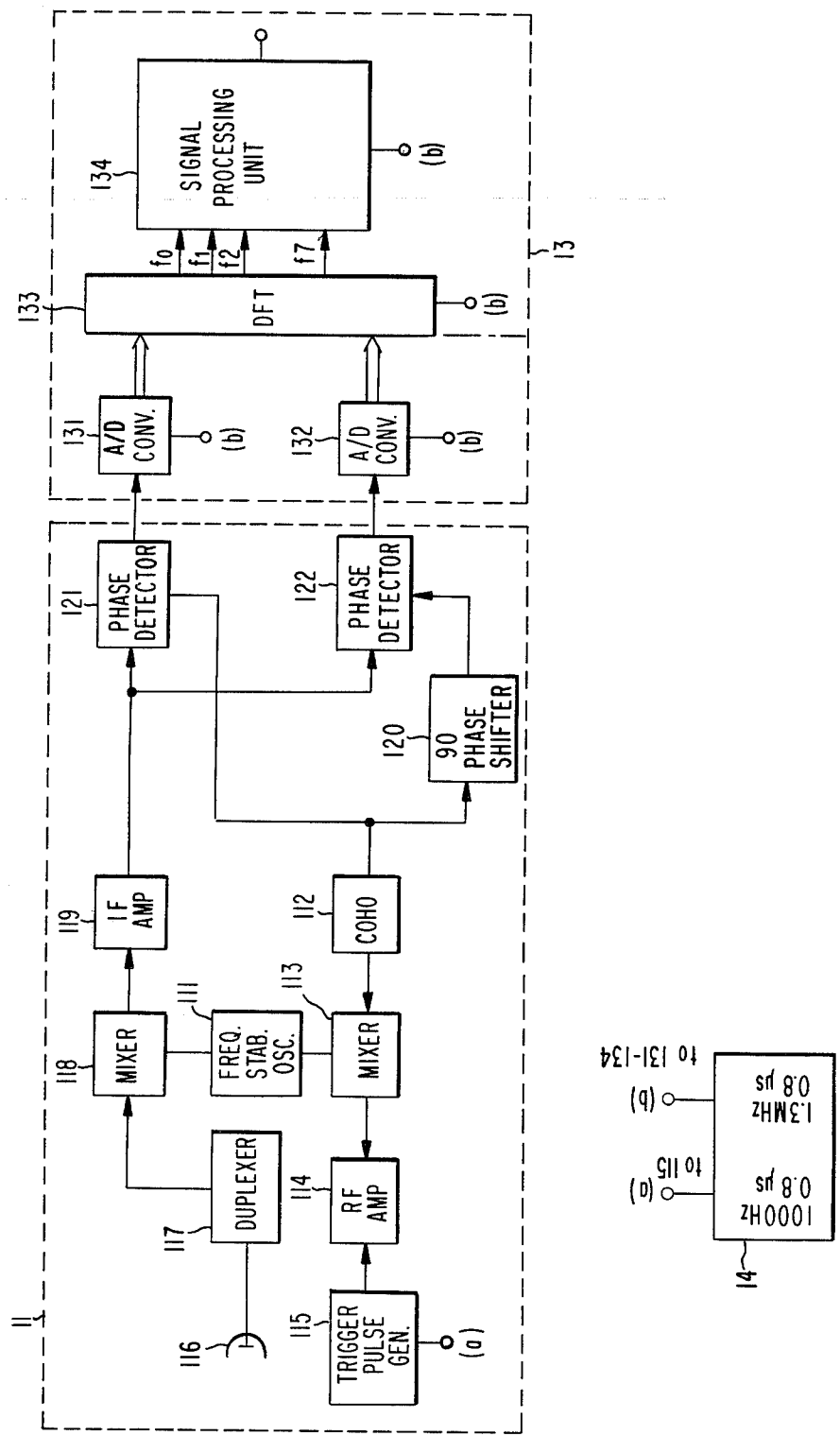
FIG. 1 shows a block diagram of a moving target indication radar according to the invention.

Refering to FIG. 1, a moving target indication radar according to the invention has a transmitter-receiver portion 11 similar to the conventional construction, signal processing portion 13 comprising A/D converters 131 and 132, a continuous DFT (discrete Fourier transform) unit 133, a signal processing unit 134 and a timing signal source 14.

The receiver-transmitter portion 11 has a frequency stabilized oscillator 111 for generating a microwave signal at frequency $f_s$, a coherent oscillator 112 of frequency $f_c$ for providing a reference phase for radar signal detection by the transmitter-receiver unit 11, a frequency mixer 113 for mixing the outputs of oscillators 111 and 112 to provide an output of frequency $f_s + f_c$, a Klystron amplifier 114 for amplifying the output of the mixer 113, a trigger pulse generator 115 for pulse-modulating the amplifier 114 to provide a microwave pulse, and a duplexer 117 for coupling the microwave pulse to an antenna 116. Also, transmitter-receiver portion 11 has a second frequency mixer 118 for mixing the microwave local oscillation from the oscillator 111 with the radar return signal coming in through the antenna 116 and the duplexer 117 to provide an IF signal at frequency $f_s$, an IF amplifier 119, and a pair of phase detectors 121 and 122 connected in parallel to the IF amplifier 119 and supplied with the reference phase oscillation directly and through a 90° phase shifter 120 from the coherent oscillator 112.

A radar pulse of microwave frequency $f_s + f_c$ and of repetition frequency equal to the frequency of the above-mentioned trigger pulse generator is transmitted through the antenna 116 while the radar return signal is coupled therethrough to the mixer 118. The Doppler speed components (including zero-Doppler speed components) of frequency deviation $f_d$ attributed to the stationary and moving objects lying in the scanned space are detected by the phase detectors 121 and 122 to form Doppler speed data or Doppler frequency data.

It is assumed here that this embodiment constitutes an ASR (airport surveillance radar). The pulse generator 115 responsive to a timing pulse supplied from terminal (a) of the pulse source 14 then generates a trigger pulse, 0.8 microseconds in width and 1000 Hz in repetition frequency which is the repetition frequency of the microwave pulses produced by the Klystron amplifier 114. The rotational period of the antenna 116 is selected to be 4 seconds. Under these conditions, the transmitter-receiver portion 11 extracts the radar data with the azimuthal directions divided into 4000 unit azimuth regions. As for the range direction, the radar data samples are produced for every one sixteenth nautical mile (nmi) corresponding to the pulse width, 0.8 microsecond, covering the whole 48 nmi nominal range. For simplicity of explanation, the embodiment is assumed to constitute an ASR, with these figures applied to the description to be given hereinafter.

As will be apparent from the description above, the radar of this embodiment is based on radar data extraction from 4000×768 unit range-azimuth regions. Therefore, a pair of in phase and quadrature radar data signals are obtained in analog form at the phase detectors 121 and 122 for every radar pulse (i.e., for every unit azimuth region) and for the 1st to 768th unit range regions, in that order. The analog radar data signals thus obtained is supplied to a pair of the A/D converters 131 and 132 in the signal processing portion 13.

The outputs of these A/D converters 131 and 132, both in parallel binary code representative respectively of the real and imaginary parts of the complex radar data signal, are applied to the continuous DFT unit 133. The A/D conversion at the converters 131 and 132 converts a pair of unit range region radar data signals obtained for each of the 768 unit range regions contained in each unit azimuth region into a pair of 10-bit parallel binary samples or codewords. More specifically, these converters 131 and 132, being supplied with the 1.3 MHz clock pulse from the terminal (b) of the timing pulse source 14 in synchronism with the radar scanning pulse, convert into a pair of binary codewords of 13 Mb/s the above-mentioned analog radar data signal at a rate of 1000 pairs per second each having 768 pairs of the unit region data. Thus, the converters 131 and 132 are adapted to perform the digitization within 0.8 microsecond for each of the unit range data to permit real-time processing of the radar signal.

Supplied with the same clock pulses as the A/D converters 131 and 132, the continuous DFT circuit 133 divides into eight Doppler frequency components $f_0$ to $f_7$, a given number of the digitized radar data samples representative, for example, eight adjacent unit azimuth regions at the same range direction distance. Subsequent DFT processing is similarly carried out in response to the unit azimuth region radar data corresponding to the immediately following radar scanning pulse. Such successive DFT processing is performed for each of the 1st to 768th unit range regions.

The data delivered from the continuous DFT circuit 133 is applied to the signal processing unit 134 where it is subjected to a clutter rejection process as described in U.S. Pat. No. 4,053,885 "MOVING TARGET INDICATION RADAR" assigned to the same assigner as the present applicant, and/or to the azimuth detecting operation to be referred to later.

The amplitudes of the Doppler frequency components produced through the DFT circuit 133 takes a distribution pattern similar to the beam pattern of the antenna 116. Therefore, if the amplitude variation of the Doppler frequency components is interpolated in the time domain, the azimuthal directions of the targets corresponding to the respective Doppler frequency components can be detected accurately.

Referring to FIG. 2 illustrating an ASR with a target T (aircraft) flying in the scanned space, since the distance the target moves within a period of time (10 to 20 milliseconds) corresponding to a plurality of scanning pulses is much smaller than one unit range region, the returns coming from the target T are those for a plurality of the radar scanning pulses (represented in FIG. 2 by antenna beam patterns 21 to 2n) reflected at the same distance in the range direction, that is to say, a series of radar data samples coming from a plurality of adjacent unit azimuth regions lying in the same region. The pattern of the amplitude variations of the radar data chain with respect to time approximates the antenna beam pattern as shown in FIG. 3(a).

The radar data series thus obtained from a plurality of unit azimuth regions lying at the same range distance are then subjected to 8-point continuous DFT processing. In other words, a combination of the radar data samples corresponding to eight consecutive scanning pulses is DFT processed for each unit range region. As the scanning pulses are successively radiated, the radar data are also successively fed to renew the eight radar data sets. The DFT processing is carried out every time the eight sample radar data is renewed by a newly incoming radar data for the same unit range region. The Doppler frequency components of the unit range region including therein the target T appear at one or more corresponding parallel output terminals for the eight frequencies $f_0$ to $f_7$ in an amplitude pattern similar to the antenna beam pattern as shown in FIG. 3(b). Therefore, the maximum amplitude point in the amplitude variation obtained corresponds to the real azimuth position of the target.

The foregoing description is based on an idealized scanned space having a single target T. In actuality, however, the scanned space includes various stationary and moving objects so that the radar returns include various clutter attributed to these objects, and therefore the amplitudes vary randomly as shown in FIG. 4(a). Since such clutter components usually spread over a larger region in the time domain than the target returns as shown in FIG. 4(b), they can be rejected by the azimuthal correlation processing which is described in detail in the above-mentioned U.S. Pat. No. 4,053,885. The clutter rejecting process achieved by the correlation processing provides the target return component with an amplitude distribution as shown in FIG. 4(c). The target components, when processed by the so-called interpolation method, indicate the real azimuth M of the target.

Signal processing for the detection of target components as described above is applicable to a target lying in any given spot in the scanned space and moving at any speed in any direction regardless of the distance in the range direction. Therefore, the invention makes it possible not only to reject the clutter but also to separately detect a plurality of targets. Furthermore since the Doppler frequency component outputs are obtained at the output of the DFT circuit 133 for every radar scanning pulse, i.e., for every incoming radar data chain, the resolution in the azimuth direction is improved remarkably.

The details of the continuous DFT circuit 133 will now be described.

According to the definition of the discrete Fourier transform, with respect to the 8-point DFT, the following relation holds $$Zm(k) = \sum_{l=0}^{7} [z(m + l)] W^{kl} \qquad (1)$$

where $W^{kl} = \exp(-j\frac{2\pi}{8}) kl$, $Zm(k)$ $(k = 0, 1, \ldots 7)$ is the DFT output corresponding to the complex input data $Zm(n)$ $(n=0, 1, \ldots, 7)$, and m and n are integers.

The continuous DFT circuit 133 according to the invention produces an 8-point DFT output expressed by the equation (1) every time the input data $Z(m)$ is supplied. The details of the DFT circuit 133 is illustrated in block form in FIG. 5.

As shown, the DFT circuit 133 has butterfly operation circuits 510 to 570 arranged in a three-stage pyramid, having shift registers 511 to 571 of a predetermined number of stages adapted to be supplied with input parallel binary codewords, multipliers 512 to 572 for multiplying the Fourier coefficient $W^{kl}$, and an adder-subtractors 513 to 573 and 514 to 574.

In the radar system of this example, complex data samples are obtained from 768 unit range regions for each scanning pulse and are subjected to a complex operation described below. For this purpose, the shift register 511 at the first stage butterfly operation circuit 510 has a capacity for four radar data chains (four unit memory capacity), each of which chains consists of radar returns from 768 unit range regions corresponding to one radar scanning pulse, while each of the shift registers 521 and 531 at the second stage has a two unit memory capacity and each of the shift registers 541 to 571 has one unit memory capacity. These shift registers are supplied with the clock signal of 1.3 MHz derived from the output terminal (b) of the timing signal source 14 shown in FIG. 1. For further details of the number of the unit range regions and the clock pulse frequency, reference is made to the U.S. patent mentioned above.

Assuming that each I-Q data pair of 768 complex radar data supplied in succession for each radar scanning pulse is expressed by $D_{R(i)}$, where i stands for the ith scanning pulse and R, the number given to the 1st through 768th unit range regions, the input radar data are successively stored in the shift-register in the order of $D_1(1), D_2(1) \ldots, D_{768}(1), D_1(2), D_2(2), \ldots, D_{768}(2), D_1(3), D_2(3), \ldots D_{768}(3), \ldots$. Since the intervals among the radar data $D_R(1), D_R(2), D_R(3)$ corresponding to adjacent unit azimuth regions at the same distance in the range direction are coincident with the repetition periods of the scanning pulse, the radar-data-representing parallel binary codewords or samples as viewed at the input and output of each shift register are always those corresponding to the unit azimuth regions at equal range distance. Accordingly, subjecting the input and output binary code signals of each shift register to the complex operation means the complex operation among the data from adjacent azimuth regions at the same range distance. Furthermore, since the input data is supplied successively for each scanning pulse, the complex operation among the data from adjacent unit azimuth regions is successively and repeatedly performed for the 1st to 768th unit range region in order. For simplicity, in the following description it is assumed that the radar data $Z(i)$ to be processed consists of those samples obtained for an equal range region and that the input data is inputed at the clock period in the order of $Z(1), Z(2), Z(3), \ldots$. Similarly, the output signal of the butterfly operation circuit 510 is expressed by $Z_1(i)$ (i=0, 1, ... 7), those of the circuits 520 and 530 by $Z_2(i)$, those of the circuit 540 to 570 by $Z_0, Z_4, Z_2, Z_6, Z_1, Z_5, Z_3, Z_7$, respectively.

The butterfly operation circuit 510 will first be described. Reference numeral 512 denotes a multiplier for multiplying by the Fourier coefficient $W^0$. When viewed at the time point at which the input data $Z(4)$ is applied to the input terminal 500, the output of the shift register 511 is $Z(0)$, with the result that the outputs $Z_1(0)$ and $Z_1(4)$ of the adder 513 and the subtractor 514 are given by:

$$Z_1(0) = Z(0) + Z(4) \times W^0$$

$$Z_1(4) = Z(0) - Z(4) \times W^0.$$

Similarly, the outputs $Z_1(1), Z_1(2), Z_1(3)$ and $Z_1(5), Z_1(6), Z_1(7)$ of the adder 513 and the subtractor 514 at the time point where the input data $Z(5), Z(6)$ and $Z(7)$ are applied to the input terminal 500 are given by:

$$Z_1(1) = Z(1) + Z(5) \times W^0$$

$$Z_1(5) = Z(1) - Z(5) \times W^0$$

$$Z_1(2) = Z(2) + Z(6) \times W^0$$

$$Z_1(6) = Z(2) - Z(6) \times W^0$$

$$Z_1(3) = Z(3) + Z(7) \times W^0$$

$$Z_1(7) = Z(3) - Z(7) \times W^0.$$

The butterfly operation circuits 520 and 530 will now be described. In these circuits, reference numerals 522 and 532 denote multipliers for multiplying by Fourier coefficients $W^0$ and $W^2$, respectively. When the input data $Z(4), Z(5), Z(6)$ and $Z(7)$ are successively applied to the input terminal 500, $Z_1(0), Z_1(1), Z_1(2), Z_1(3)$ and $Z_1(4), Z_1(5), Z_1(6), Z_1(7)$ are subsequently applied to the butterfly operation circuits 520 and 530. At the time point where $Z_1(2)$ is applied to the butterfly operation circuit 520, the output of the shift register 521 is $Z_1(0)$ and thus the outputs $Z_2(0)$ and $Z_2(2)$ of the adder 523 and the subtractor 524 are given by:

$$Z_2(0) = Z_1(0) + Z_1(2) \times W^0$$

$$Z_2(2) = Z_1(0) - Z_1(2) \times W^0$$

The outputs $Z_2(1)$ and $Z_2(3)$ of the adder 523 and the subtractor 524 at the time point where $Z_1(3)$ is supplied to the butterfly operation circuit 520, are expressed by:

$$Z_2(1) = Z_1(1) + Z_1(3) \times W^0$$

$$Z_2(3) = Z_1(1) - Z_1(3) \times W^0$$

The outputs $Z_2(4), Z_2(5)$ and $Z_2(6)$ and $Z_2(7)$ from the adder 533 and the subtractor 534 as $Z_1(6)$ and $Z_1(7)$ subsequently supplied to the butterfly operation circuit 530, are similarly given by:

$$Z_2(4) = Z_1(4) + Z_1(6) \times W^2$$

$$Z_2(6) = Z_1(4) - Z_1(6) \times W^2$$

$$Z_2(5) = Z_1(5) + Z_1(7) \times W^2$$

$$Z_2(7) = Z_1(5) - Z_1(7) \times W^2$$

Description will not be given of the butterfly operation circuits 540, 550, 560 and 570. At the time point where the input data $Z(7)$ is applied to the input terminal 500, $Z_2(1), Z_2(3), Z_2(5)$ and $Z_2(7)$ are supplied to the butterfly operation circuit 540 to 570, respectively, as stated above. In these circuits, multipliers 542, 552, 562 and 572 are multipliers for multiplying Fourier coefficients $W^0, W^2, W^1$ and $W^3$, respectively. The output signals $Z_0, Z_4, Z_2, Z_6, Z_1, Z_5, Z_3$ and $Z_7$ from the output terminals 580 to 587 at the time point where $Z(7)$ is applied to the input terminal 500 are given in a similar manner by:

$$Z_0 = Z_2(0) + Z_2(1) \times W^0$$

$$Z_4 = Z_2(0) - Z_2(1) \times W^0$$

$$Z_2 = Z_2(2) + Z_2(3) \times W^2$$

$$Z_6 = Z_2(2) - Z_2(3) \times W^2$$

$$Z_1 = z_2(4) + Z_2(5) \times W^1$$

$$Z_5 = Z_2(4) - Z_2(5) \times W^1$$

$$Z_3 = Z_2(6) + Z_2(7) \times W^3$$

$$Z_7 = Z_2(6) - Z_2(7) \times W^3.$$

where $Z_0, Z_1 \ldots Z_7$ are the DFT outputs obtained when eight data samples $Z(0)$ to $Z(7)$ are subjected to the discrete Fourier transform.

Figure 5:
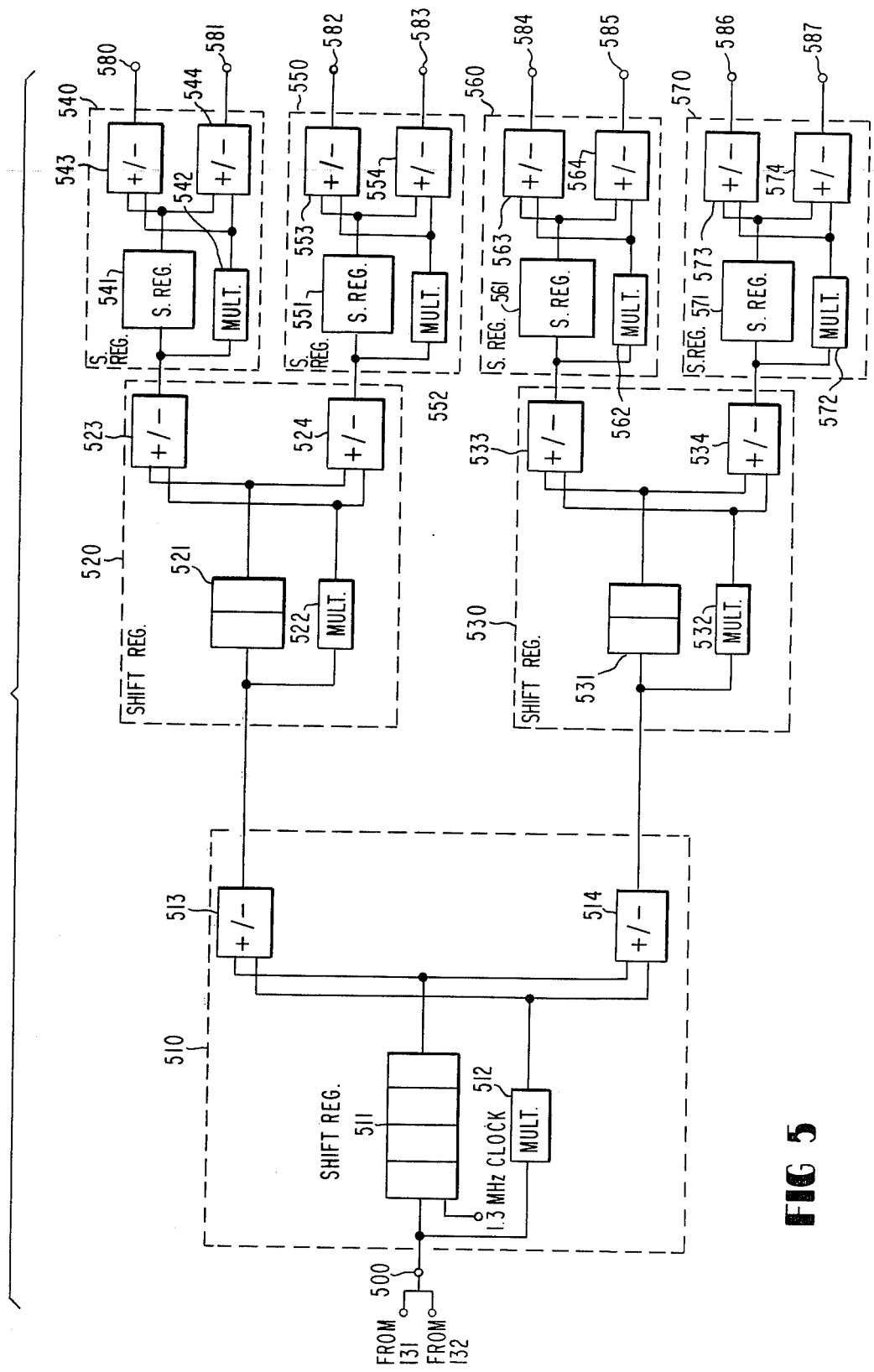
FIGS. 5 and 6 show circuit diagrams of examples of discrete Fourier transform (DFT) circuits according to the invention.

At the time point where $Z(8)$ is applied to the input terminal 500, the circuit in FIG. 5 produces at the output terminals 580 to 587 the DFT outputs corresponding to eight data samples $Z(1)$ to $Z(8)$.

As described above, the DFT circuit in FIG. 5 is a continuous DFT operation circuit for which to subsequently excute the DFT operation of the eight input signal combination.

The Fourier coefficient constituting the butterfly circuits at the respective stages shown in FIG. 5 are given as shown in the following table, depending on $W^{kl}$ in the equation (1) and the periodicity of the Fourier coefficient.

| Stage | Reference numeral of Multipliers | Fourier Coefficient |
|---|---|---|
| 1st | Multiplier 512 | $W^0$ |
| 2nd | Multiplier 522 | $W^0$ |
|  | Multiplier 532 | $W^2$ |
| 3rd | Multiplier 542 | $W^0$ |
|  | Multiplier 552 | $W^2$ |
|  | Multiplier 562 | $W^1$ |
|  | Multiplier 572 | $W^3$ |

For an N-point DFT, $W^{kl}$ is given by $$W^{kl} = \exp(j\frac{2\pi}{N})kl$$

When the number of DFT points is 16, that is, when the data from 16 adjacent unit azimuth regions are processed by the DFT, for example, the fourth stage multiplier is provided with the Fourier coefficients in the following sequence: $W^0, W^4, W^2, W^6, W^1, W^5, W^3, W^7$. Similarly, when the number of DFT points is 32, for example, the 5th stage multiplier, which must be additionally provided, is furnished with the following sequence of Fourier coefficients:

$W^0, W^8, W^4, W^{12}, W^2, W^{10}, W^6, W^{14}, W^1, W^9, W^5, W^{13}, W^3, W^{11}, W^7, W^{15}$.

Figure 6:
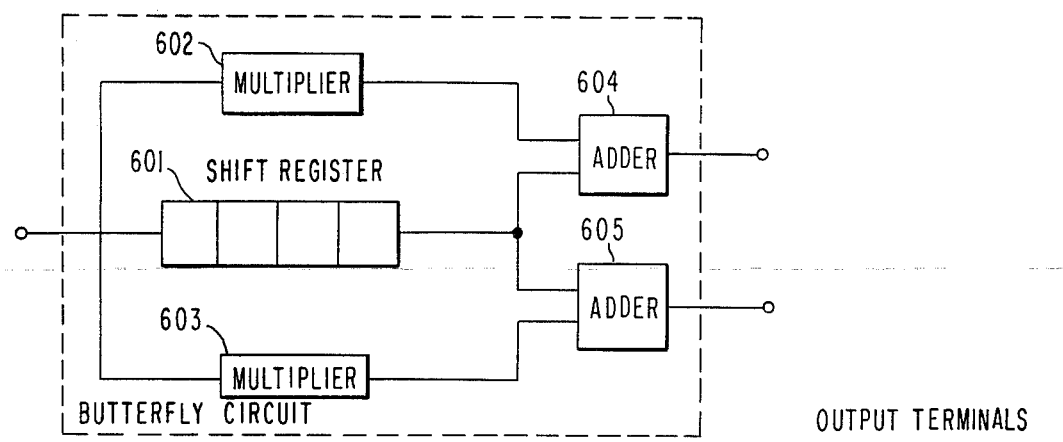

Each butterfly circuit shown in FIG. 5 may be replaced by a butterfly circuit comprising a shift register 601, two Fourier coefficient multiplying circuits 602 and 603, and adders 604 and 605. In other words, the butterfly circuit of FIG. 5 is a simplified version of the circuit of FIG. 6. Two Fourier multiplying circuits of FIG. 6 are simplified into a single Fourier multiplying circuit by taking advantage of the periodic and symmetrical nature of the Fourier coefficient and with one of the two adders replaced by a subtractor.

The DFT circuit 133 shown in FIG. 5 may be structured as an actual operating circuit by separating the circuit components in FIG. 5 into a real part operation section and an imagniary part section. Such a circuit is shown in block form in FIG. 7. As shown, the circuit includes a real part input terminal 701, an imaginary part input terminal 702, shift registers 703 and 704 having a four unit memory capacity, operation circuits 705 to 708 having a one and two unit memory capacity, respectively, operation circuits 715 to 722 connected to the input terminals 701 and 702, and output terminals 723 to 738. It will be noted that the A/D converters 131 and 132 shown in the block diagram of FIG. 1 are connected at the outputs to the input terminals 701 and 702 in the FIG. 7 circuit, respectively.

Figure 8:
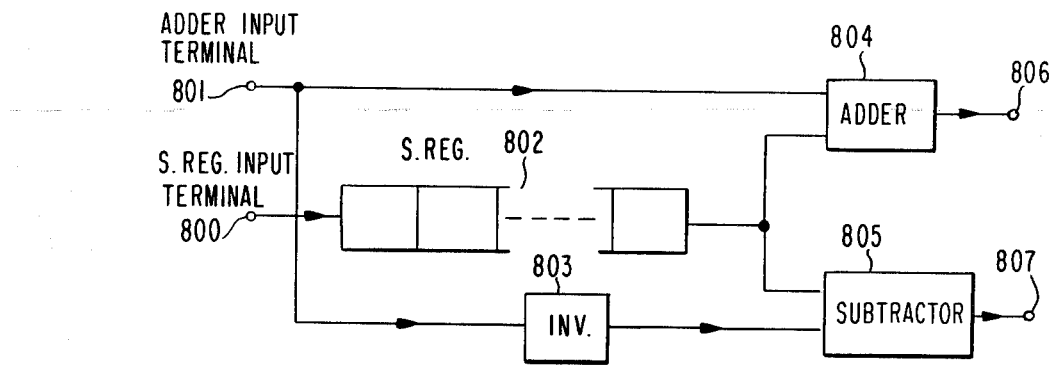
FIGS. 8 and 9 show block diagrams illustrating the details of a part of the circuit shown in FIG. 7.

The operation circuit having shift registers of H unit memory capacity may be constructed as shown in FIG. 8. As shown, the operation circuit has a shift register input terminal 800, an adder input terminal 801, a shift register 802 of H unit memory capacity, an inverter 803, an adder 804 for summing the output terminal of the shift register 802 and the input from the adder input terminal 801, a subtractor 805 for subtracting the input to the input terminal 801 from the output of the shift register 802, and output terminals 806 and 807.

Figure 9:
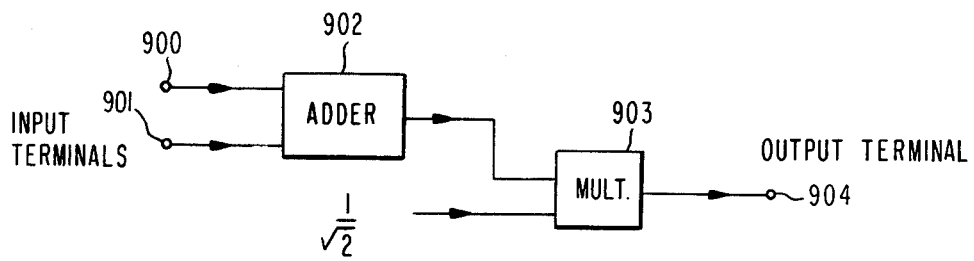

Each of the multiplying circuit 709 to 712, as shown in FIG. 9, includes an adder 902 for summing input signals from both the input terminals 900 and 901, a multiplier 903 for multiplying the output of the adder 902 by the Fourier coefficient $1/\sqrt{2}$ in the case of an 8 point DFT, and an output terminal 904.

To describe the operation of the DFT circuit, it is assumed first that the radar data samples each having a complex value obtained for every transmitting pulse as in the case of FIG. 5, successively arrive in the order of $X(0)+jy(0), X(1)+jy(1), x(2)+jy(2), \ldots, x(7)+jy(7), \ldots$ Based on this assumption, time sequential signals $x(0), x(1), x(2), \ldots$ and $y(0), y(1), y(2), \ldots$ are successively applied to the real part input terminal 701 and to the imaginary part input terminal 702, respectively.

As described above, according to the definition of the discrete Fourier transform, the 8-point DFT output $Xm(k)+jYm(k)$ $(k=0, 1, \ldots, 7)$ for $x(n) +jy(n)$ $(n=m, m+7)$ is given by $$Xm(k) + jYm(k) = \sum_{l=0}^{7}[x(m+l)+jy(m+l)]e^{-j\frac{2\pi}{8}kl} \quad (2)$$

At the time point where $x(7)$ is applied to the real part input terminal 1 and $y(7)$ to the imaginary part input terminal 2, the outputs of the operation circuit 703 is $x(3)+x(7)$ and $x(3)-x(7)$ and the outputs of the operation circuit 704 become $y(3)+y(7)$ and $y(3)-y(7)$. The input of the operation circuit 705 is $x(3)+x(7)$ and the output of the internal shift register in the operation circuit 705 is $x(1)+x(5)$. Therefore, the output of the adder is $$x(1)+x(3)+x(5)+x(7)$$

The output of the subtractor is $$x(1)-x(3)+x(5)-x(7)$$

The data sum $$x(1)+x(3)+x(5)+x(7)$$

applied to the operation circuit 715 and the output $$x(0)+x(2)+x(4)+x(6)$$

of the internal shift register are subjected to an arithmetic operation with the result that the following results appear at the output terminals 23 and 24, respectively:

$$x(0)+x(1)+x(2)+x(3)+x(4)+x(5)+x(6)+x(7)$$

$$x(0)-x(1)+x(2)-x(3)+x(4)-x(5)+x(6)-x(7).$$

As seen from the equation (1), these are equal to $X_0(0)$ and $X_0(4)$, respectively. In exactly the same manner, $Y_0(0)$ and $Y_0(4)$ appear at the output terminals 731 and 732, respectively.

Similarly, $Xm(0), Xm(4), Xm(2), Xm(6), Xm(1), Xm(5), Xm(7), Xm(3)$ successively appear at the output terminals 723 to 730 while simultaneously $Ym(0), Ym(4), Ym(6), Ym(2), Ym(7), Ym(8), Ym(1), Ym(5)$ successively appear at the output terminals 731 to 738.

Figure 10:
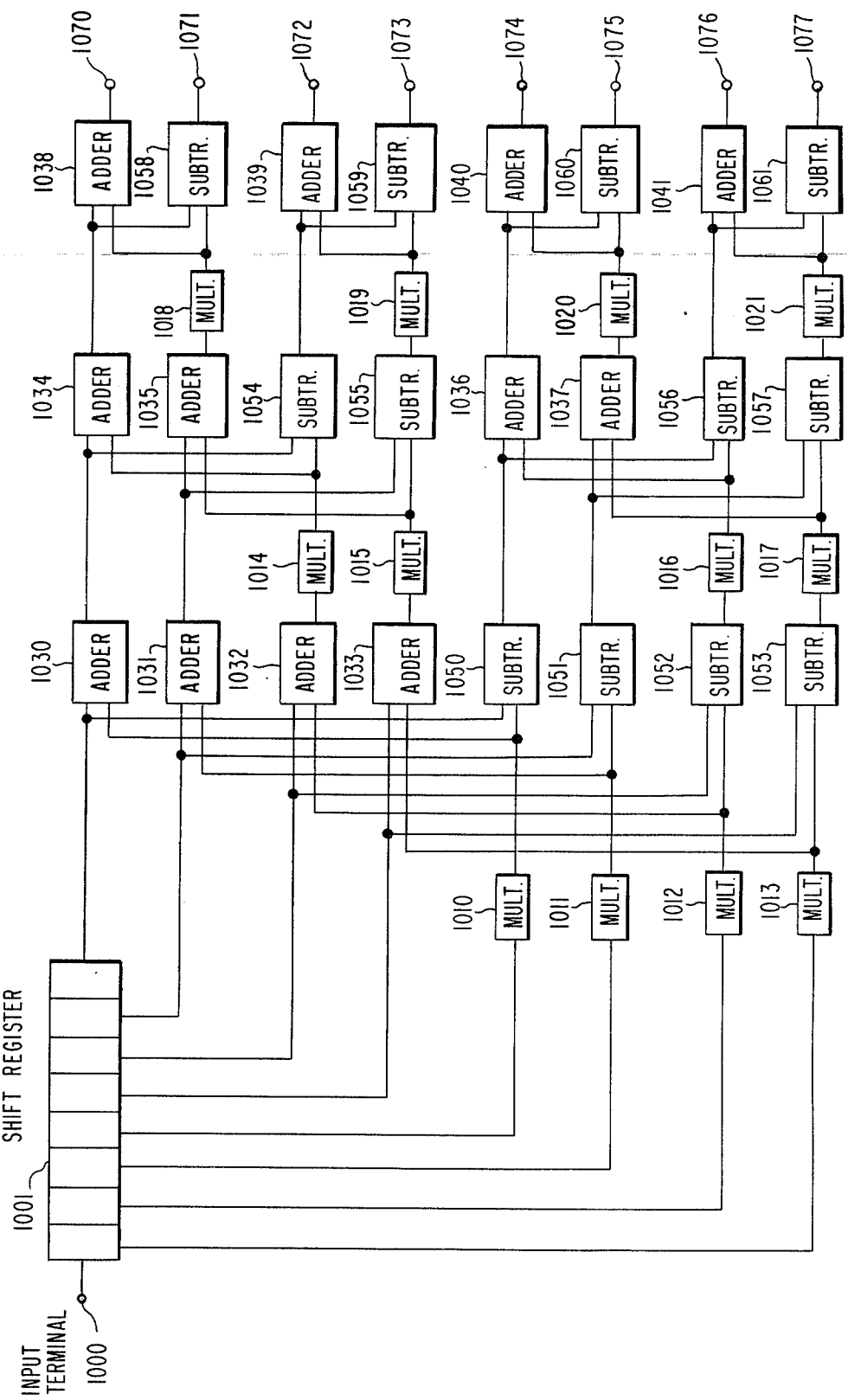
FIG. 10 shows a circuit diagram of another example of the DFT according to the invention.

In FIG. 10 illustrating another embodiment of the continuous DFT circuit, reference numeral 1000 denotes an input terminal; 1001, shift memories having a memory capacity of one unit corresponding to one scanning pulse permitting the memory contents at the respective stages to be outputed in parallel; 1010 to 1021, multipliers for multiplying Fourier coefficients; 1030 to 1041, adders; 1050 to 1061, substractors; and 1070 to 1077, output terminals. In operation, the radar data sample chain produced for every radar scanning pulse, denoted by Z(i) (i=0, 1, ...), are applied to the input terminal 1000 in the order of Z(0), Z(1), Z(2) .... On this assumption, at the time point where the output signals of the shift register 1001 are Z(0), Z(1), ... Z(7), the outputs $Z_1(0)$, $Z_1(1)$, ... of the operation circuits 1030 to 1033, 1050 to 1053 at the first stage, the outputs $Z_2(0)$, $Z_2(1)$, ..., $Z_2(7)$, of the operation circuits 1034, 1035, ..., 1057 at the second stage and the outputs $Z_0$, $Z_4$, $Z_2$, $Z_6$, $Z_1$, $Z_5$, $Z_3$, $Z_7$, of the operation circuits 1038, 1058, 1039, 1059, 1040, 1060, 1041, and 1061 at the third stage, respectively, are given by:

(1st Stage):

$$Z_1(0) = Z(0) + Z(4) \cdot W^0$$

$$Z_1(4) = Z(0) - Z(4) \cdot W^0$$

$$Z_1(1) = Z(1) + Z(5) \cdot W^0$$

$$Z_1(5) = Z(1) - Z(5) \cdot W^0$$

$$Z_1(2) = Z(2) + Z(6) \cdot W^0$$

$$Z_1(6) = Z(2) - Z(6) \cdot W^0$$

$$Z_1(3) = Z(3) + Z(7) \cdot W^0$$

$$Z_1(7) = Z(3) - Z(7) \cdot W^0$$

(2nd Stage):

$$Z_2(0) = Z_1(0) + Z_1(2) \cdot W^0$$

$$Z_2(2) = Z_1(0) - Z_1(2) \cdot W^0$$

$$Z_2(1) = Z_1(1) + Z_1(3) \cdot W^0$$

$$Z_2(3) = Z_1(1) - Z_1(3) \cdot W^0$$

$$Z_2(4) = Z_1(4) + Z_1(6) \cdot W^2$$

$$Z_2(6) = Z_1(4) - Z_1(6) \cdot W^2$$

$$Z_2(5) = Z_1(5) + Z_1(7) \cdot W^2$$

$$Z_2(7) = Z_1(5) - Z_1(7) \cdot W^2$$

(3rd Stage)

$$Z_0 = Z_2(0) + Z_2(1) \cdot W^0$$

$$Z_4 = Z_2(0) - Z_2(3) \cdot W^0$$

$$Z_2 = Z_2(2) + Z_2(3) \cdot W^2$$

$$Z_6 = Z_2(2) - Z_2(3) \cdot W^2$$

$$Z_1 = Z_2(4) + Z_2(5) \cdot W^1$$

$$Z_5 = Z_2(4) - Z_2(5) \cdot W^1$$

$$Z_3 = Z_2(6) + Z_2(7) \cdot W^3$$

$$Z_7 = Z_2(6) - Z_2(7) \cdot W^3$$

where W represents the Fourier coefficient given by the equation (1).

As described above, the DFT operation circuit may be realized by the circuit construction shown in FIG. 10. It will be seen further that the circuit construction in FIG. 10 can perform the continuous DFT operation.

be used instead. More particularly, the shift register 511 of the first stage butterfly circuit 510 in FIG. 5 may be replaced by a RAM having a four unit memory capacity. In such a modification, the first input data sample (the data stored four radar scanning pulse periods before) is read out from the RAM for every sampling interval of the received radar data. The readout data is loaded into the RAM's of the butterfly circuits 520 and 530 at the second stage while the data corresponding to the immediately following unit range region is loaded at the same time into the RAM at the first stage. Further, the RAMs at the second and third stages are so designed as to have the memory capacities of two radar data chains. The write and read operations are performed at the sampling periods.

Figure 7:
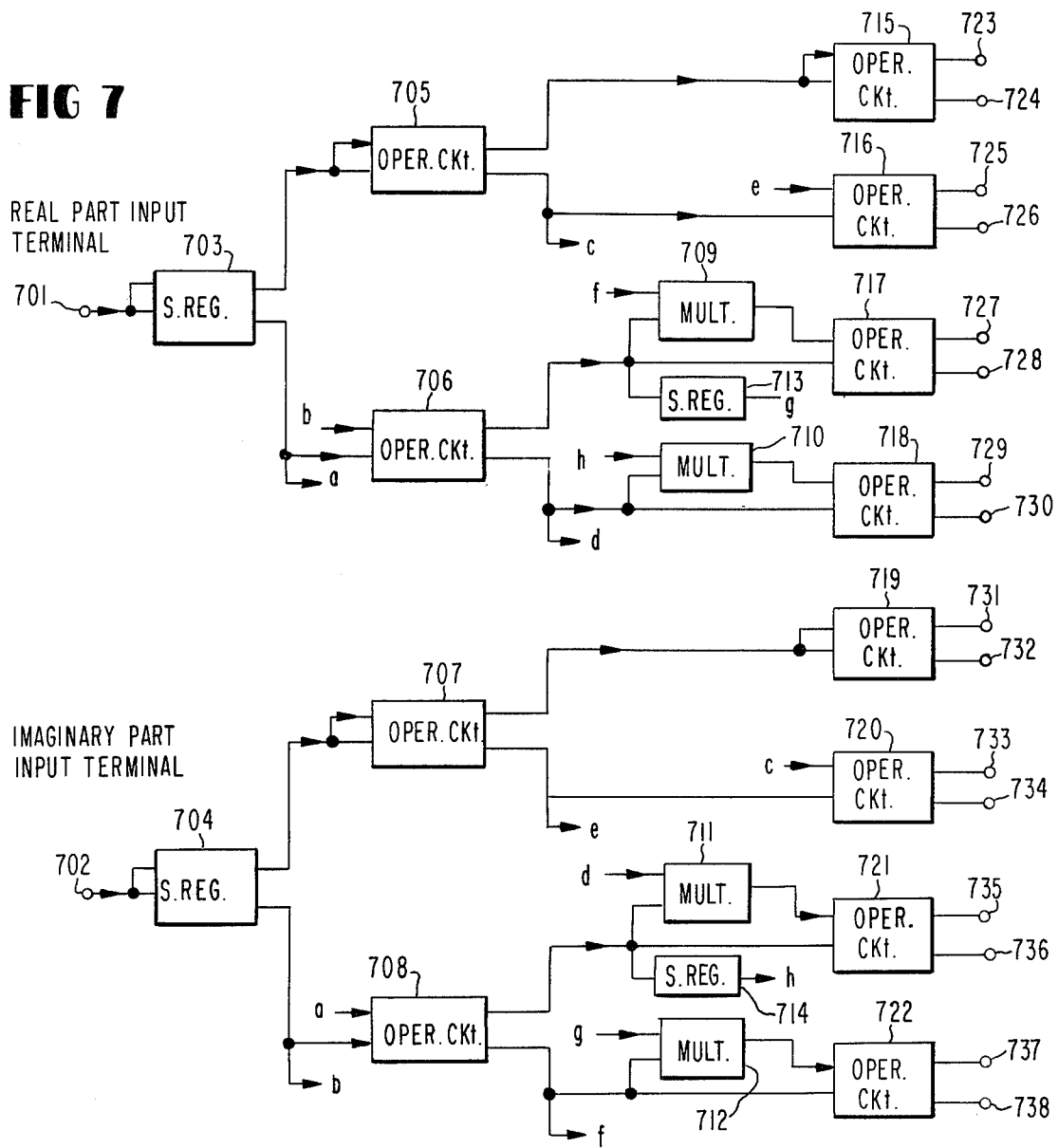
FIG. 7 shows a block diagram for illustrating the details of a part of the circuit shown in FIG. 5.
Figure 11:
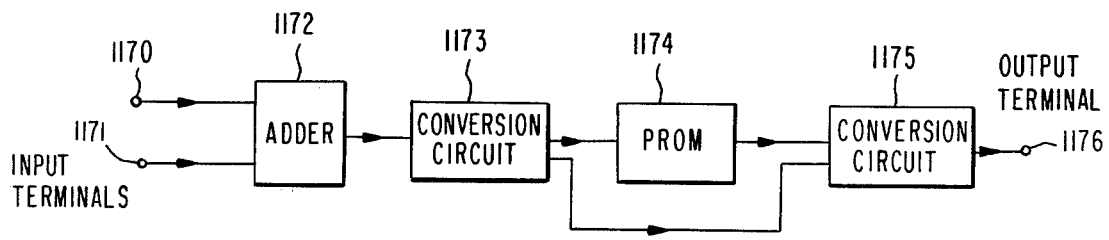
FIG. 11 shows a block diagram of a modification of the DFT circuit according to the invention.

The multiplying circuit shown in FIG. 7 may also be constructed as shown in FIG. 11 which requires a smaller number of circuit components than the circuit of FIG. 7. In contrast to the latter performing the multiplication of the Fourier coefficient by using the multiplier, the former is so constructed that the radar data, expressed in the fixed decimal point format, are converted into floating decimal point format and then subjected to Fourier coefficient multiplication by a programmable read only memory (PROM) and then reconstructed in the fixed point data format. More specifically, the multiplying circuit has input terminals 1170 and 1171, an adder 1172, a fixed-to-floating decimal point conversion circuit 1173, a PROM 1174, a floating-to-fixed decimal point conversion circuit 1175, and an output terminal 1176. In operation, input radar date samples coming in through the input terminals 1170 and 1172 are summed at the adder 1172 and are divided into an exponent part and a mantissa part at the conversion circuit 1173. The mantissa part is sent to the PROM 1174 while the exponent part is sent to the conversion circuit 1175. In the circuit 1175, the data bit length of the mantissa is equalized to that of the input data applied to each input terminal 501 and 502 in FIG. 5.

The mantissa part sent to the PROM serves as an address data to read out the data multiplied by the Fourier coefficient $1/\sqrt{2}$ from the PROM. The mantissa part multiplied by the Fourier coefficient from the PROM and the exponent data from the converting circuit 1173 are combined at the converting circuit 1175 and the combined output appears at the output terminal 1176 in the form of a data in the fixed decimal point. As a matter of course, the floating point multiplication method is applicable to the other embodiments of the invention.

The application of the floating point multiplication method to the DFT circuit is advantageous for the following reason. As seen from the foregoing the DFT device is in short an operational circuit comprising a combination of a multiplier and an adder. The Fourier coefficients are all less than or equal to unity. When these facts are taken into consideration, it is seen that the analog quantity of the Fourier transform output for an N-point DFT may generally take a value up to N times as large as the input analog quantity. Assuming the $$m = \log_2 N,$$

the bit number in the binary operation increases by m. If the fixed decimal point system is used to perform the multiplication, $a\Sigma X_i$ (a is a constant and $X_i$ is a mea- Similarly to the circuit of FIG. 6, the circuit of FIG. 10 can be modified such that the subtractor at each stage is replaced by an adder, with one multiplier added.

While shift registers are assumed to be employed in the foregoing embodiments, random access memories (RAM's) or any other acceptable memory devices may sured value, and i=1, 2, ..., N), which is a basic operation in the DFT operation, the multiplier needed is one of (n+m bits) x (n+m bits). This means that the bit number, which increases by m, causes a great increase of the circuit components.

On the other hand, if the multiplication a$\Sigma$Xi is performed with the floating decimal point system, the number of bits in the exponent part of $\Sigma$Xi required for maintaining the same accuracy as that in the fixed decimal point method will be the number n of the Xi. Therefore, an n-bit by n-bit multiplier may satisfactorily be used for executing the multiplication. Thus, when the DFT circuit needs a number of stages of addition, employment of the floating decimal point method for the multiplication section simplifies the hardware of the DFT circuit. In the case where the number of bits is small, the multiplication may be executed by PROM in place of the multiplier.

The number of the DFT points, which is the foregoing discussion was assumed to be 8, may instead be 16 or 32. In a practical radar system, however, there is a limit to the number of the DFT points. In general, the pulse repetition period (PRP) of the scanning pulse is limited by the time necessary for the radar scanning pulse to travel to the farthest point of the radar range selected. As the rotating speed of the antenna is increased with a fixed PRP, the number of the return signals from the same target, i.e., the number of data samples corresponding to a particular target, decreases. Conversely, when the rotating speed is decreased, the number of data samples increases accordingly. However, in the latter case, the rotation of the antenna takes a longer time, making it difficult to track a target moving at a high speed. It is for this reason that some restriction is placed when the PRP and the rotation speed of the antenna are selected. In an ordinary radar system, a correlation taken among the return signals successively obtained from the same target for 10 to 16 adjacent unit azimuth regions is satisfactory.

When these facts are taken into consideration, it will be noted that the DFT circuit shown in FIG. 10 needs more circuit components than the FIG. 5 circuit since a parallel operation is performed for each Fourier output. However, the number of the circuit components needed for the circuit of FIG. 5 also increases exponentially as the number of DFT points increases. Thus, when the number of DFT points exceeds a given value, the circuit in FIG. 10 is advantageous over the circuit in FIG. 5. However, in an oridnary moving target indication radar, the number of DFT points is relatively small as described above. Therefore, the FIG. 5 circuit is desirable from the viewpoint of hardware simplification.

This completes the description of the preferred embodiments of the invention. Although preferred embodiments have been described, it is believed that numerous modifications and alterations thereto would be apparent to one having ordinary skill in the art without departing from the spirit and scope of the invention.

What is claimed is:

1. A moving target indication radar comprising:
   transmitting means for transmitting a microwave pulse of a predetermined width at a predetermined repetition period into space through an antenna rotating at a constant speed;
   receiving means for receiving pulse returns from stationary and moving objects lying in the space scanned by said antenna, said pulse returns being received for every unit azimuth region corresponding to one microwave pulse in the form of a radar data signal having a resolution for unit range regions related to the width of said microwave pulse;
   analog to digital converting means for converting the received radar data signal into digital samples;
   continuous discrete Fourier transform means, responsive to N of said digital samples representative respectively of radar returns from N adjacent unit azimuth regions corresponding to N contiguous microwave pulses, for providing N Doppler frequency components representative of relative speeds of said stationary and moving objects lying in said unit azimuth regions every time radar data signals corresponding to an immediately adjacent unit azimuth region in the same unit range region is supplied; and
   means for processing the output of said continuous discrete Fourier transform means to separately detect said returns from said moving objects and reject the returns from said stationary objects and to detect azimuthal position of the desired moving target.

2. A moving target indication radar as set forth in claim 1, in which said discrete Fourier transform means comprises:
   a plurality of butterfly operation circuits each including a memory having a capacity equal to an integral multiple of a unit memory capacity for said unit radar data chain multiplied by the number of bits assigned to each of said samples corresponding to each unit range region, a multiplier for multiplying the input signal to said memory by a predetermined Fourier coefficient and an adder-subtractor circuit for adding and subtracting the output signal from said multiplier and the output signal from said memory, those butterfly operation circuits being arranged in n stages (n=log$_2$N) with $2^{K-1}$ butterfly operation circuits included in the Kth stage; means for supplying the digital sample to the input of the first stage butterfly circuit; means for connecting said butterfly operation circuits so as to supply the addition and subtraction outputs of the addition/subtraction processing to the input of the memory in the succeeding butterfly operation circuit; and means for controlling the read and write operations for said memory in synchronism with the microwave pulse.

3. A moving target indication radar system as set forth in claim 2, in which the memory capacity of said memory partly forming the butterfly operation circuit is N/$2^K$ times as large as said unit memory capacity.

4. A moving target indication radar system as set forth in claim 1, in which said discrete Fourier transform means comprises: a shift register having a memory capacity equal to an integral multiple of said unit memory capacity; a multiplier for multiplying the input signal applied to said shift register by a given Fourier coefficient; a plurality of butterfly operating circuits each including an adder/subtractor circuit for adding and subtracting the output signals from said multiplier and said shift register, said butterfly operation circuits being arranged in n stages (n=log$_2$N) with $2^{K-1}$ butterfly operation circuits included in the Kth stage; means for supplying the radar data to the first stage butterfly circuit; and means for connecting said butterfly operation circuits so as to supply the addition and subtraction outputs of the addition/subtraction processing to the input of said memory in the succeeding butterfly circuit.

5. A moving target indication radar as set forth in claim 4, in which the memory capacity of said memory partly forming the butterfly circuit is $N/2^K$ times as large as said unit memory capacity.

6. A moving target indication radar system as set forth in claim 2 or 4, in which said butterfly operation circuit has two multipliers for multiplying given Fourier coefficients with inverted but equal values, said memory or shift register, and two adders which are coupled at one input terminal to the outputs of said memory or shift register and at the other input terminal to the outputs of said multipliers, respectively.

7. A moving target indication radar as set forth in claim 1, in which said discrete Fourier transform means comprises; memory means of memory capacity equal to N times as large as said unit memory capacity and capable of delivering in parallel the stored radar data from N memory output terminals, operation means of n stages ($n = \log_2 N$) each including $N/2$ adders, $N/2$ subtractors, and $N/2$ multipliers, a group of $N/2$ adders coupled at one input with the memory outputs from the 1st to $N/2$th memory output terminals in the first stage of said operation means and at the other input with the output of a multiplier for multiplying by a given Fourier coefficient the data delayed by $N/2$ data positions behing said one input in the memory outputs from the $(N/2+1)$th to the Nth memory output terminals, a group of $N/2$ subtractors connected at the input with said one and other inputs of said adder group, a group of $N/2^K$ adders coupled at one input with the preceeding output of said memory or the output of the adder correspondingly connected to the adder connected at one input to said preceeding output in the output of adder groups each including $N/2^K$ adders at the $(K-1)$th stage in the Kth operation means which have been divided into groups, and at the input with a multiplier for multiplying by a given Fourier coefficient the data time-delayed by $N/2^K$ data positions from said one input in the succeeding output of said memory, and a group of $N/2^K$ subtractors connected at the input with said one input and said other input of said adder group.

8. A moving target indication radar as set forth in claim 7, in which said first stage subtractor group comprises of a group of $N/2$ adders coupled at one input with said one input of said first stage adder group and at the other input with the output of a multiplier for multiplying the data time-delayed by $N/2$ data positions by a Fourier coefficient which is equal in value but opposite in the sign to said given Fourier coefficient, and said Kth stage subtractor group comprises a group of $N/2^K$ adders coupled at one input with said one input of said Kth stage adder group and at the other input with the output of a multiplier for multiplying the data time-delayed by $N/2^K$ data positions by a Fourier coefficient which is equal in value but opposite in the sign to said given Fourier coefficient in said Kth stage.

9. A moving target indication radar system as set forth in claim 2, 3, 4, 5, 7 or 8, in which said multiplier comprises a fixed-to-floating decimal point converting circuit for converting fixed decimal point data into floating decimal point data thereby to produce an output in the form of a mantissa part and an exponent part of a predetermined number of digits; a read only memory for receiving the mantissa part data as address data and for producing as an output the received data multiplied by a given Fourier coefficient; and a floating-to-fixed decimal point converting circuit for receiving the output of said read only memory and the exponent part and producing an output on the fixed decimal point.

10. A moving target indication radar system as set forth in claim 1, 2, 3, 4, 5, 7, or 8, in which $N=8$.

11. A moving target indication radar system as set forth in claim 6, in which $N=8$.

12. A moving target indication radar system as set forth in claim 9, in which $N=8$.

13. A moving target indication radar system as set forth in claim 6, in which said multiplier comprises a fixed-to-floating decimal point converting circuit for converting fixed decimal point data into floating decimal point data thereby to produce an output in the form of a mantissa part and an exponent part of a predetermined number of digits; a read only memory for receiving the mantissa part data as addressed data and for producing as an output the received data multiplied by a given Fourier coefficient; and a floating-to-fixed decimal point converting circuit for receiving the output of said read only memory and the exponent part and producing an output on the fixed decimal point.

* * * * *

UNITED STATES PATENT AND TRADEMARK OFFICE
CERTIFICATE OF CORRECTION

PATENT NO. : 4,222,050

DATED : September 9, 1980

INVENTOR(S) : Kiuchi et al

It is certified that error appears in the above—identified patent and that said Letters Patent is hereby corrected as shown below:

IN THE SPECIFICATION

Column 1, line 54, after "because" delete "that";

Column 2, line 13, change "O'Leary's" to -- O'Leary --;

line 31, after "pulse" insert -- , --;

line 32, after "obtained" delete ",";

line 49, delete "Dopper" and insert -- Doppler --;

Column 3, line 58, delete "Refering" and insert -- Referring --;

Column 4, line 40, after "one" insert -- - --;

line 54, change "is" to -- are --;

Column 5, line 22, delete "assigner" and insert -- assignee --;

line 23, change "applicant" to -- application --;

line 43, after "same" insert -- range --;

Column 6, line 18, delete "the distance in";

line 19, delete "direction";

line 50, after "and" delete "an";

UNITED STATES PATENT AND TRADEMARK OFFICE
CERTIFICATE OF CORRECTION

PATENT NO. : 4,222,050
DATED : September 9, 1980
INVENTOR(S) : Kiuchi et al

It is certified that error appears in the above—identified patent and that said Letters Patent is hereby corrected as shown below:

Column 8, line 51, delete "$z_2(4)$" and insert -- $Z_2(4)$ --;

line 67, delete "excute" and insert -- execute --;

Column 9, line 25, after "must" insert -- then --;

Column 10, line 1, after "8" insert -- - --;

Column 11, line 46, after "(3rd Stage)" insert -- : --;

Column 12, before line 1, insert -- Similarly to the circuit . . . memory devices may -- which are lines 1-6 of Column 13;

line 32, delete "date" and insert -- data --;

line 34, delete "1172" (first occurrence) and insert -- 1171 --;

line 36, delete "117" and insert -- 1174 --;

line 37, delete "4";

line 62, delete "the" and insert -- that --;

Column 13, lines 1-6, delete first six lines in entirety.

line 25, after "Which" delete "is" and insert -- in --.

UNITED STATES PATENT AND TRADEMARK OFFICE
CERTIFICATE OF CORRECTION

PATENT NO. : 4,222,050

DATED : September 9, 1980

INVENTOR(S) : Kiuchi et al

It is certified that error appears in the above—identified patent and that said Letters Patent is hereby corrected as shown below:

IN THE CLAIMS

Column 15, line 25, change "behing" to -- behind --;

line 30, change "preceeding" to -- preceding --;

line 33, change "preceeding" to -- preceding --.

Signed and Sealed this

Tenth Day of February 1981

[SEAL]

Attest:

RENE D. TEGTMEYER

Attesting Officer

Acting Commissioner of Patents and Trademarks